United States Patent
Lepisto et al.

(10) Patent No.: US 10,155,420 B2
(45) Date of Patent: Dec. 18, 2018

(54) VEHICLE TIRE

(71) Applicants: Samu Lepisto, Tampere (FI); Jorma Tikka, Tampere (FI)

(72) Inventors: Samu Lepisto, Tampere (FI); Jorma Tikka, Tampere (FI)

(73) Assignee: NOKIAN RENKAAT OYJ, Nokia (FI)

( * ) Notice: Subject to any disclaimer, the term of this patent is extended or adjusted under 35 U.S.C. 154(b) by 190 days.

(21) Appl. No.: 14/503,572

(22) Filed: Oct. 1, 2014

(65) Prior Publication Data

US 2015/0090383 A1    Apr. 2, 2015

(30) Foreign Application Priority Data

Oct. 2, 2013  (FI) .................................... 20135983

(51) Int. Cl.
  *B60C 11/03*   (2006.01)
  *B60C 11/13*   (2006.01)
  *B60C 19/00*   (2006.01)

(52) U.S. Cl.
  CPC ...... *B60C 11/1307* (2013.01); *B60C 11/0304* (2013.01); *B60C 11/0306* (2013.01); *B60C 11/13* (2013.01); *B60C 11/1369* (2013.01); *B60C 19/001* (2013.01); *B60C 2011/0365* (2013.01); *B60C 2011/0369* (2013.01); *B60C 2011/0372* (2013.01);
  (Continued)

(58) Field of Classification Search
  CPC . B60C 11/13; B60C 11/1307; B60C 11/0304; B60C 2011/0369; B60C 2011/0381; B60C 2011/0365; B60C 2011/0372; B60C 13/1315; B60C 11/1369; B60C 11/1315
  See application file for complete search history.

(56) References Cited

U.S. PATENT DOCUMENTS

| | | | |
|---|---|---|---|
| 4,641,696 A | 2/1987 | Semin et al. | |
| 5,158,626 A * | 10/1992 | Himuro | B60C 11/0306 152/209.28 |

(Continued)

FOREIGN PATENT DOCUMENTS

| | | |
|---|---|---|
| CN | 101115633 A | 1/2008 |
| DE | 102011056636 A1 * | 6/2013 |

(Continued)

OTHER PUBLICATIONS

Machine translation for Japam 2010-215103 (no date).*
(Continued)

*Primary Examiner* — Steven D Maki
(74) *Attorney, Agent, or Firm* — Young & Thompson

(57) ABSTRACT

A vehicle tire (1), comprising a tread (2) which is intended for rolling contact against a surface, said tread (2) being formed with a tread pattern (20) which comprises circumferential grooves (25) and transverse grooves (26) for removing water from a contact patch between the surface and the tire (1). The transverse groove (26) increases in width when progressing in a longitudinal direction of the transverse groove (26) from a sidewall (41, 42) of the tire (1) towards a center line (CL) of the tire and when progressing in a radial direction (R) outward from a base (263) of the transverse groove.

8 Claims, 3 Drawing Sheets

Figure 1:
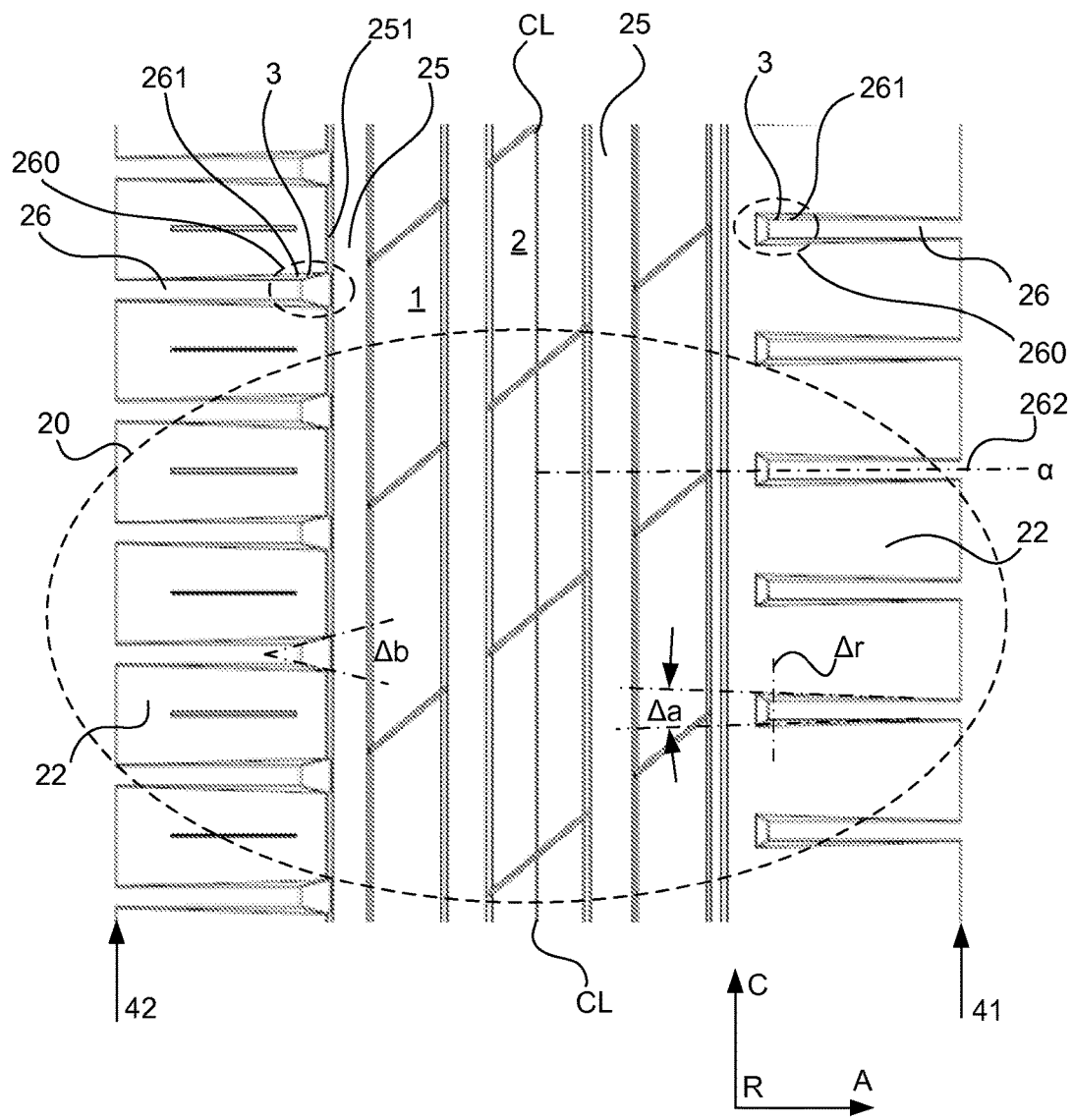

(52) U.S. Cl.
CPC .............. *B60C 2011/0381* (2013.01); *B60C 2011/0388* (2013.01); *B60C 2011/0393* (2013.01)

(56) References Cited

U.S. PATENT DOCUMENTS

| | | | |
|---|---|---|---|
| 2002/0092591 A1* | 7/2002 | Cortes | B60C 11/0309 152/209.18 |
| 2007/0000590 A1* | 1/2007 | Murata | B60C 11/0083 152/209.8 |
| 2007/0215258 A1* | 9/2007 | Fukunaga | B60C 11/0302 152/209.18 |
| 2009/0008014 A1* | 1/2009 | Segawa | B60C 3/06 152/517 |
| 2010/0084061 A1 | 4/2010 | Kiwaki | |

FOREIGN PATENT DOCUMENTS

| | | | |
|---|---|---|---|
| EP | 602989 A1 | * | 6/1994 |
| EP | 2316666 A2 | | 5/2011 |
| JP | 02-099409 A | * | 4/1990 |
| JP | 2003-311743 A | * | 11/2003 |
| JP | 2007-001484 A | * | 1/2007 |
| JP | 2009149124 A | | 7/2009 |
| JP | 2010-215103 A | * | 9/2010 |
| KR | 2003-0050421 A | * | 6/2003 |
| WO | 2013092206 A1 | | 6/2013 |

OTHER PUBLICATIONS

Machine translation for Japan 2007-001484 (no date).*
Machine translation for Japan 2003-311747 (no date).*
Machine translation for Korea 2003-0050421 (no date).*
Machine translation for German 102011056636 (no date).*
Machine translation for Japan 02-099409 (no date).*
FI Search Report, dated Mar. 17, 2014, from corresponding FI application.
Mar. 21, 2017, CN communication issued for CN application No. 201410516220.X.

* cited by examiner

VEHICLE TIRE

FIELD OF THE INVENTION

The invention relates to a vehicle tire, comprising a tread which is intended for rolling contact against a surface, said tread being formed with a tread pattern which comprises circumferential grooves and transverse grooves for removing water from a contact patch between the surface and the tire, the width of the transverse groove increases when progressing in a longitudinal direction of the transverse groove from a sidewall of the tire towards a center line of the tire and when progressing in a radial direction outward from a base of the transverse groove.

BACKGROUND OF THE INVENTION

The vehicle tire has a tread with a function of establishing rolling contact with a surface, such as a roadway. The tread is formed with a tread pattern featuring divergent grooves for providing the tread with tread blocks, i.e. the tread comprises blocks and grooves. The grooves have a purpose of enabling the water, possibly present on the surface, to flow in a way to establish a contact as good and tight as possible between the tread, more specifically a tread block, and the roadway. The water present on the surface is displaced by means of the grooves from under the tread blocks primarily sideways of the tire. Some of the water remains within confines of the grooves, whereby the tire rolls over the water in such a way that, at the rolling portion, the water runs along the grooves alongside the tread blocks past the rolling portion. Vehicle tires in road traffic service are legally required to have sufficiently deep grooves for the safe operation of a vehicle in fluctuating weather conditions.

The flow rate of water in a groove is naturally strongly dependent on the driving speed of a vehicle. The effect of grooves on the flow rate and volume flow of water is a significant factor in terms of contact between water and tire. In the event that the grooves are not able to displace a sufficient amount of water from the rolling portion, i.e. from the contact patch, the tire will climb onto the top of a water cushion present on the surface, for so-called aquaplaning, whereby the friction between tire and surface disappears almost completely. Hence, it is an objective to provide such a design for the grooves that the flow of water in a groove is as efficient as possible.

In prior art, the subject matter is discussed in U.S. Pat. No. 4,641,696, which discloses a tread pattern, which has a determined rotating direction and which is intensely divided with grooves into tread blocks, and which has obliquely disposed transversal grooves guiding water towards a sidewall of the tire. The publication also suggests that the apices of blocks can be inclined in order to avoid premature wear-and-tear and ripping and chipping of the blocks.

The prior art also discloses WO 2013/092206 A1, which presents a transverse groove commencing from the middle of a tread block and having its beginning inclined in two directions.

The prior art further discloses EP 2 316 666 A2, which also presents one embodiment of a transverse groove inclined in two directions from the middle of a profile block.

SUMMARY OF THE INVENTION

It is an objective of the invention to further develop the flow characteristics of a groove for enhancing the flow of water in the groove. One objective is to develop the flow characteristics of a groove in a so-called "inside/outside" type of tire, which is hence intended to be installed on a vehicle with a specific sidewall always for the outside/inside, but in which the rotating direction is not predetermined. In the event that both the installation direction and the rotating direction were determined, the same tire would have to be manufactured in two models, tires for the left side and for the right side of a vehicle, thus requiring a double number of e.g. manufacturing molds. If just the rotating direction were determined, the geometry of grooves could be optimized from the standpoint of water flow, but it may be necessary to make compromises regarding other properties of the tire. Another objective of the present invention is to attain the above-described characteristics in a manner as production friendly and efficient as possible in order to maintain the manufacturing costs as low as possible for a tire of top quality characteristics.

A characterizing feature of the invention is that the widest point of a transverse groove is located at the confluence of a transverse groove and a circumferential groove.

This presented solution fulfills the set objectives. The widening, which is formed at what in water flowing direction is the beginning of a transverse groove, has been found in studies to enhance distinctly the transverse flow of water and to reduce the tire's propensity to aquaplaning. Thus, the transverse groove is given a widening shape towards incoming water, thereby providing a sort of funnel that opens into the incoming direction, whereby water is more likely to be "compelled" into the transverse groove and cannot continue its journey along the circumferential groove or the surface of a tread block. Especially in a tire constructed with the "inside/outside" geometry of undetermined rotation direction, the presented solution works well. It is determined by the vehicle tire manufacturer as to when the tire is an inside/outside tire model, in which case it is marked for installation on a vehicle with the specific sidewall outward.

According to one embodiment, said increasing of a transverse groove width in longitudinal and radial directions has been accomplished by means of faceted surfaces. One function of transverse grooves is to displace water from a circumferential groove into a transverse groove and further out from the edge of a contact patch. The developed transverse groove shape increases the volume flow of water in a transverse groove with respect to a transverse groove which is otherwise similar but without said shape. Said increase of volume flow has a direct link with the reduction of aquaplaning sensitivity, i.e. with the fact that the vehicle tire does not so easily climb onto the top of a water cushion present on the surface. By virtue of the shape, the flow of water at the intersection of a transverse groove and a circumferential groove is enhanced and water is more rapidly displaced from between a block and a surface into the grooves and further along the grooves sideways out of the contact patch.

In said inside/outside tires, the transverse groove extend typically in axial direction to provide the flow of water as desired regardless of the tire rotating direction. In studies regarding tire groove patterns, the Applicant has found that water flows quite efficiently in transverse grooves. It is still desirable, however, that in a transverse groove of the above-mentioned type the groove's conveying capacity be put to particularly efficient use and the flow be improved even further. Studies have revealed that, by virtue of the presently developed bi-directionally opening transverse groove shape, the water is able to flow in the early stage of a flowing process at a particularly high rate of speed both from the actual flowing direction and as a return flow from the opposite direction, thus providing a volume flow for the groove (which is calculably the flow rate multiplied by the groove's cross-sectional area) as large as possible. Because increasing the cross-sectional area of a transverse groove would result in a reduction of the tire's load-bearing surface area and thereby a reduction of the tire's carrying capacity, the relationship between the surface areas of grooves and respectively tread blocks must be in a balance adjusted in view of intended use. When operating within the subsequently mentioned dimensional range of expanding form and within the range of conventional size passenger car tires, such as with the rim size of 13" to 22", the flow of water has been successfully made highly efficient and the effect on aquaplaning speed limit can be as much as several percentage points.

In the context of this invention-related specification, the groove refers to an elongated open space constructed on a tire tread. Respectively, the tread pattern refers to a pattern which is established by the geometry created by the grooves and tread blocks left therebetween. In the context of this application, the circumferential groove refers to such a circumferentially directed groove which progresses primarily in a tire rolling direction, i.e. in a plane perpendicular (90° to the axis of rotation. In this context, however, the circumferential groove is also considered to include such a groove progressing primarily in the rolling direction, which practices a returning zigzag pattern, whereby tracking the groove shall bring one back to the departure point as long as the tire has been rotated a complete revolution around its axis or rotation. In the context of this application, the transverse groove refers to such a groove which progresses in a lateral direction of the tire, i.e. at an angle of about $\alpha=0°$, yet $\alpha \leq \pm 15°$, relative to an axial direction of the tire. The tire is often provided with grooves of varying cross-sectional sizes and, in the context of this invention-related specification, the grooves largest in cross-section can be referred to by the term main flow groove. In the context of this specification, the depth direction or the radial direction refers to a direction which extends from an outer surface of the tread layer in radial direction towards the tire's axis of rotation or from the axis of rotation in radial direction outward.

BRIEF OF THE DESCRIPTION OF THE DRAWINGS

Figure 2A:
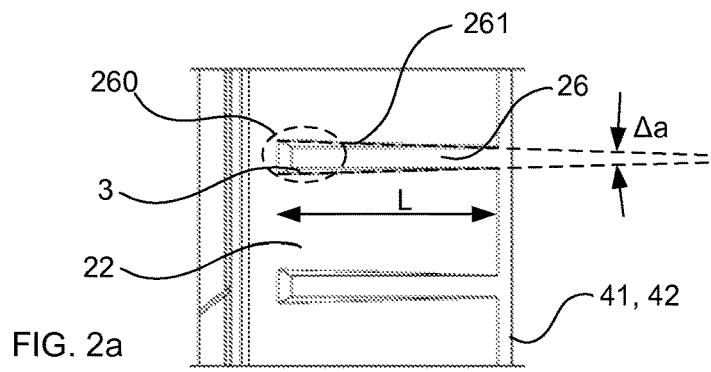
Figure 2B:
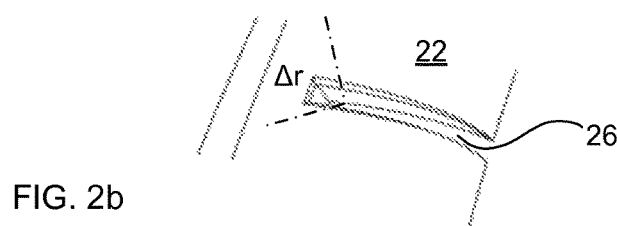
Figure 3A:
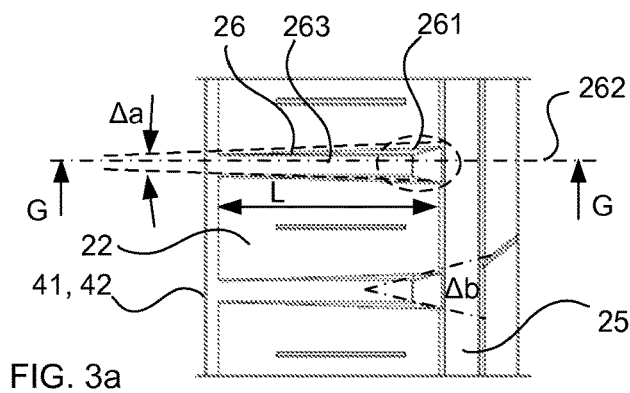
Figure 3B:
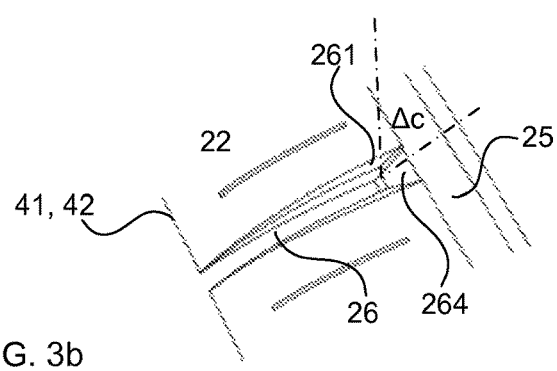
Figure 3C:
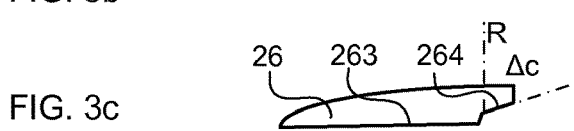
Figure 4:
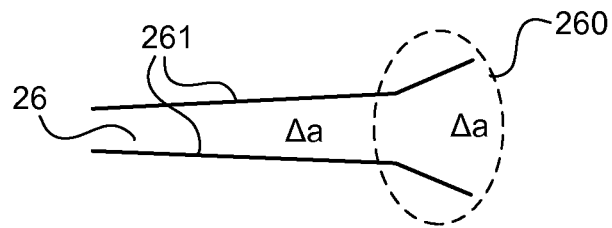
Figure 5:
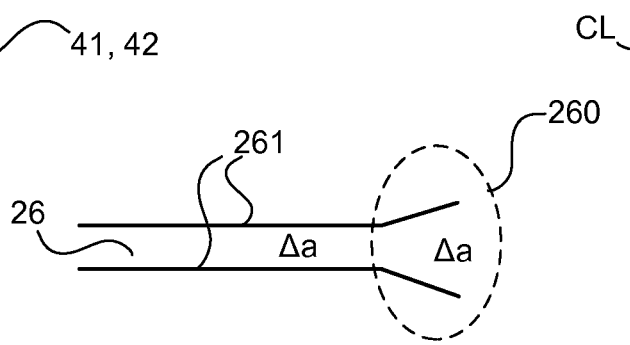
Figure 6:
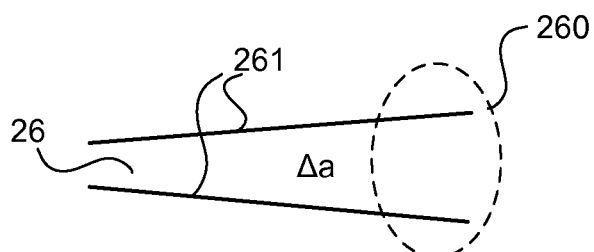
Figure 7:
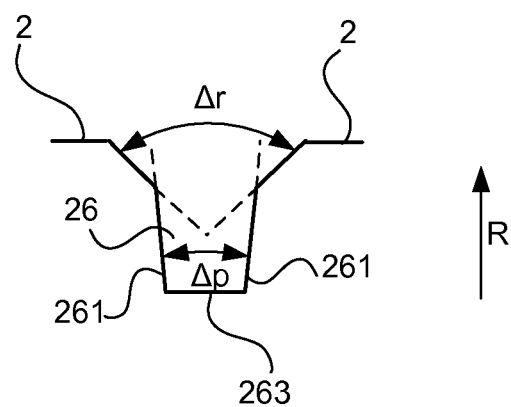

The invention will now be described in more detail with reference to the accompanying figures, in which figures FIG. 1 shows one example of a tire surface and possible expanding transverse groove shapes, FIGS. 2a and 2b show an expanding groove in one embodiment, FIGS. 3a and 3b show one other embodiment, FIG. 3c shows a transverse groove in circumferentially directed cross-section, FIGS. 4, 5 and 6 show a transverse groove in various embodiments, FIG. 7 shows a transverse groove in cross-section.

DETAILED DESCRIPTION OF THE INVENTION

FIG. 1 shows in an overall view the surface of a vehicle tire 1, comprising a tread 2 intended for rolling contact with a surface, said tread 2 having been formed with a tread pattern 20 which comprises circumferential grooves 25 and transverse grooves 26 for removing water from a contact patch between the surface and the tire 1. The transverse groove 26 increasing in width when progressing in a longitudinal direction of the transverse groove 26 from a sidewall 41, 42 of the tire 1 towards a center line CL of the tire and when progressing in a radial direction R outward from a bottom 263 of the transverse groove. An end 260 of the transverse groove 26 closer to the vehicle tire's center line CL is thereby given the shape of a wedge of a partial funnel in such a way that the shape has its converging apex pointing in the direction of the transverse groove 26 towards the tire's sidewall 41, 42 and said shape additionally opening outward in the radial direction R. Therefore, the shape brings about an expansion of the transverse groove 26 towards the incoming direction of water and its contraction towards the outgoing direction of water. Accordingly, the transverse groove can thus have its walls 261 inclined in two directions as opposed to a traditional straight groove of uniform width. In FIG. 1, the vertical direction represents a circumferential direction C of the tire, a horizontal direction represents an axial direction A of the tire, and the tire's radial direction R extends perpendicularly to the plane of the figure.

FIG. 1 shows an embodiment which is one application of the inside/outside tire. On the right in FIG. 1 is an intended outer sidewall and on the left is an intended inner sidewall of the tire. Therefore, the transverse grooves 26 to the right of the center line CL, and the apex of their shape, point towards the external sidewall 41. Respectively, the transverse grooves 26 to the left of the center line CL, and the apex of their shape, point towards the internal sidewall 42. With respect to the axial direction A, the transverse grooves 26 (or a midline 262 thereof) are at an angle $\alpha=0°$, i.e. the transverse grooves are parallel to the axial direction. In the illustrated embodiment, on the side of the tire's outside shoulder (sidewall 41), it is the widest point of the transverse groove 26 which starts the transverse groove 26 from the location of a rib, web or block 22. On the side of the tire's inside shoulder (sidewall 42), the transverse grooves 26 start from a circumferential groove 25. At a confluence of the transverse groove 26 and the circumferential groove there is an additional chamfer, establishing an angle $\Delta b$ of 15 to 90 degrees between the walls 261 in a longitudinal direction of the transverse groove 26. The purpose of this additional chamfer is to increase the water removing performance of an expanding transverse groove even further.

FIGS. 2a and 2b illustrate, in a plan view (FIG. 2a) and in a slightly oblique plan view (FIG. 2b), one detailed embodiment for a transverse groove 26 which starts from the middle of a tread block 22. In this embodiment, the expanding shape has been established to cover in axial direction the length of the entire groove 26. An expansion angle $\Delta a$ in the direction of the transverse groove is functional within the range of 3 to 60 degrees, whereof FIGS. 2a and 2b illustrate the angle $\Delta a$ of about 3 degrees. What is particularly evident from FIGS. 2a and 2b is how the expanding shape has been established in two directions, both in axial and radial direction. Thereby, it is from a gap, which is present between the tread block 22 and the surface and closes in a driving situation, that water flows into an end region of the transverse groove 26 and onward into the transverse groove, the water quickly attaining in the transverse groove 26 a remarkably high rate of flow and discharging effectively towards the tire's sidewall 41, 42. It is also notable that the embodiment shown in FIGS. 2a and 2b is applicable both on the outer sidewall and on the inner sidewall of a tire.

FIGS. 3a and 3b illustrate, in a plan view (FIG. 3a) and in a lightly oblique plan view (FIG. 3b), one detailed embodiment for a transverse groove 26 which starts from a circumferential groove 25. Also in this embodiment, the expanding portion has been made to cover in axial direction the length of the entire groove 26. The expanding portion has an angle Δa in the direction of the transverse groove within the range of 3 to 90 degrees, whereof FIGS. 2a and 2b illustrate the angle Δa of about 3 degrees. What is particularly evident from FIGS. 3a and 3b is how the expanding shape has been established in two directions, both in axial and radial direction. Thereby, it is from a gap, which is present between the tread block 22 and the surface and closes in a driving situation, that water flows from an end region of the transverse groove 26 into the transverse groove, the water quickly attaining in the groove 26 a remarkably high rate of flow and discharging effectively towards the tire's sidewall 41, 42. It is also notable that the embodiment shown in FIGS. 3a and 3b is applicable both on the outer sidewall and on the inner sidewall of a tire. At a confluence of the transverse groove 26 and the circumferential groove there is an additional chamfer, establishing an angle Δb of 15 to 90 degrees between the walls 261 in a longitudinal direction of the transverse groove 26. Furthermore, there is a guide surface 264 visible in FIG. 3b. The guide surface 264, which is present at the confluence of the transverse groove 26 and the circumferential groove 25, has an angle Δc of 30 to 75 degrees relative to a normal of the tread.

FIG. 3c still depicts the transverse groove in a longitudinal section from a midline 262 of the transverse groove matching a line G-G in FIG. 3a. Noticeable from this figure is a shape of the transverse groove 26 and how the guide surface 264 is inclined towards a base 263 of the transverse groove. The angle Δc is 30 to 75 degrees between the guide surface 264 and the tire's radial direction or normal of the tread. It is an objective of the guide surface to participate in the guidance of water flow in such a way that the water fills the transverse groove 26 in an appropriate manner also in the radial direction R, thereby enhancing an early phase of the flow.

In the embodiments shown in the above-described figures, the variable width shape has been implemented to continue over the entire length of a transverse groove. It should be noted, however, that the discussed shape may also exist only in an end region 260 of the transverse groove 26, for example at a distance L=3 to 25 mm from the circumferential groove 25 or from some other departure point. This aforesaid application, regarding just the end region 260, applies to the widening of a transverse groove both in longitudinal and in radial direction. By means of an additional chamfer, the end region can also be provided with another widening shape, whereby the number of widening shapes is two or more in succession. This way is also obtained a good commencement of the flow. In embodiments, wherein the widening portion does not cover the entire length of a transverse groove, it may extend over the above-mentioned length as seen from the transverse groove's starting point. Furthermore, the flaring of the transverse groove 26 outward in radial direction R may result in deviation from a hypothetical continuous shape of the transverse groove's 26 wall 261, thus increasing inclination of the transverse groove's wall 261 relative to a normal of the tread. This feature is particularly evident from FIGS. 2b and 3b, in which the change of inclination is clearly visible.

In the above-mentioned "short" wedge embodiments, said confluence with the transverse groove 26 terminates in water flowing direction the cross-sectional downsizing of the transverse groove 26 when progressing towards the tire's sidewall. As for preferred embodiments, the angle in transverse groove direction Δa is 3 to 60 degrees. Likewise, the opening angle in radial direction Δr is 20 to 90 degrees, most preferably Δr≤60°. Hence, the result is most often that the opening Δa in the transverse groove direction is not equal to the radial direction opening angle Δr.

FIGS. 4, 5 and 6 illustrate in a significantly simplified manner an end shape for the transverse groove 26 in a plan view. In FIG. 4, the geometry comprises two successive mutually angled transverse groove walls 261, which define a transverse groove 26. A wider angle portion of the transverse groove is located at an end 260 closer to the center line.

The geometry shown in FIG. 5 comprises mutually angled transverse groove walls 261, which define a transverse groove 26. A larger width portion of the transverse groove is located at an end 260 closer to the center line CL. In the embodiment shown in FIG. 5, a portion of the transverse groove closer to the sidewall 41, 42 is constant in width, i.e. the angle Δa between the walls 261 is 0 degrees.

According to the embodiments shown in FIGS. 4 and 5, the transverse groove 26 grows in width when progressing in a longitudinal direction of the transverse groove 26 from the sidewall 41, 42 of the tire 1 towards the tire's center line CL over part of the groove's length, particularly at the end 260 closer to the center line CL, whereby the end of the transverse groove 26 closer to the sidewall 41, 42 has a constant width or has its width increasing less than the end 260 closer to the center line CL. Thus, the angle between the walls of the transverse groove 26 in the transverse groove direction Δa is 0 to 15 degrees at the sidewall and 15 to 90 degrees at the end 260 close to the center line CL. In the embodiments shown in FIGS. 4 and 5, the Δa has a particular significance in the sense that, by virtue of the shape, water is able to flow in the early stages of a flow situation at a particularly high rate of speed both from the actual flowing direction and, as a return flow, from the opposite direction.

In the embodiment shown in FIG. 6, the transverse groove 26 increases in width when progressing in a longitudinal direction of the transverse groove 26 from the tire's sidewall 41, 42 towards the tire's center line CL over the entire length of the transverse groove 26. Thus, the angle between the walls of the transverse groove 26 in the transverse groove direction Δa is 3 to 15 degrees.

FIG. 7 shows one embodiment for a longitudinal cross-section of the transverse groove 26. The transverse groove 26 has an opening angle in the radial direction Δr of 20 to 90 degrees, most preferably Δr 60°. It should also be noted that the grooves of a vehicle tire are typically of a discharging type, whereby, especially for reasons of production engineering, the grooves widen at a discharge angle Δp which is typically in the order of about 5 degrees, most often in the range of 0.5 to 7°, but, in terms of flow engineering, it is different from the herein presented chamfer formation, which is present at a junction of the tread 2 and the transverse groove 26 and designed on the basis of flow engineering aspects, and from the transverse groove's opening in radial direction at the angle Δr.

The above-mentioned expanding shape is designed most preferably in such a way that each sidewall 261 of the transverse groove 26 is formed with an inclined chamfer surface. In certain special cases, however, the shape could have been designed to be asymmetrical with respect to the transverse groove either in axial or radial direction.

As obvious for a skilled artisan, the invention and its embodiments are not limited to the foregoing exemplary embodiments. The expressions included in the claims, describing the existence of characterizing features, for example "the tire comprises a tread", are open terms in the sense that the presentation of characterizing features does not rule out the existence of other such characterizing features which have not been presented in the independent or dependent claims.

REFERENCE NUMERALS PRESENTED IN THE FIGURES 1 tire
2 tread
20 tread pattern
22 tread block
25 circumferential groove
251 wall of circumferential groove
26 transverse groove
260 end region of transverse groove
261 wall of transverse groove
262 midline of transverse groove
263 base of transverse groove
264 guide surface
41 sidewall (outer sidewall)
42 sidewall (inner sidewall)
α angle of transverse groove with respect to tire's axial direction
CL center line
Δa opening angle in the direction of transverse groove
Δb opening angle provided by additional chamfer
Δc angle of guide surface 264 relative to a normal of the tread
Δr opening angle of the shape in radial direction
Δp at discharge angle
C circumferential direction
A axial direction
R radial direction
G-G section line

The invention claimed is:

1. A vehicle tire, comprising:
a tread which is intended for rolling contact against a surface,
said tread being formed with a tread pattern which comprises a circumferential groove and a transverse groove for removing water from a contact patch between the surface and the tire, the transverse groove extending from the circumferential groove to an edge of the contact patch,
wherein the transverse groove progresses in a lateral direction of the tire at an angle of 0° relative to an axial direction of the tire,
wherein the tire is designed as an inside/outside tire, which is marked to be installed on a vehicle with a predetermined sidewall facing outward,
wherein the width of the transverse groove increases when progressing in a longitudinal direction of the transverse groove from a sidewall of the tire towards a center line of the tread and when progressing in a radial direction outward from a base of the transverse groove,
wherein the transverse groove has its widest point at a confluence of the transverse groove and the circumferential groove, the transverse groove has its end closer to the center line of the tread provided with a guide surface, which is inclined to downgrade towards the base of the transverse groove, inclines towards the circumferential groove, and is arranged such that the guide surface comprises a circumferential direction of the tire, the guide surface having a first flat part with a first angle of inclination with respect to the radial direction and a second flat part with a second angle of inclination with respect to the radial direction, wherein the first angle of inclination is smaller than the second angle of inclination, the first part is closer to the sidewall than the second part, and both the first part and the second part incline towards the circumferential groove,
wherein an angle that opens in a longitudinal direction of the transverse groove is left between walls of the transverse groove such that in the longitudinal direction of the transverse groove at the sidewall the angle is from 0 to 15 degrees and at the end closer to the center line of the tread the angle is from 15 to 90 degrees, and
wherein the tread further comprises at least another circumferential groove and another transverse groove, and
wherein when progressing in a longitudinal direction of the transverse groove from the sidewall of the tire towards the tread's center line, the transverse groove increases in width over the entire length of the transverse groove.

2. A vehicle tire according to claim 1, wherein said increase in width of the transverse groove in longitudinal direction and in radial direction has been achieved by means of inclined surfaces.

3. A vehicle tire according to claim 1, wherein a wall of the transverse groove has a first inclination and a second inclination relative to a normal of the tread.

4. A vehicle tire according to claim 1, wherein an angle between walls of the transverse groove at the sidewall in a longitudinal direction of the transverse groove is from 3 to 15 degrees.

5. A vehicle tire according to claim 1, wherein the confluence of the transverse groove and the circumferential groove is provided with an additional chamfer, as a result of which an angle between the walls in a longitudinal direction of the transverse groove will be 15 to 90 degrees.

6. A vehicle tire according to claim 1, wherein the guide surface present at the confluence of the transverse groove and the circumferential groove has an angle of 30 to 75 degrees relative to an outward radial direction of the tire at the point of the guide surface.

7. A vehicle tire according to claim 1, wherein the transverse groove has an opening angle in a radial direction of 20 to 90 degrees.

8. A vehicle tire according to claim 1, wherein said increase in width of the transverse groove is obtained in such a way that each sidewall of the transverse groove is formed with an inclined surface.

* * * * *